United States Patent [19]

Kilmer, Sr.

[11] Patent Number: 5,486,130
[45] Date of Patent: Jan. 23, 1996

[54] METHOD AND APPARATUS FOR SIMULTANEOUSLY GRINDING MULTIPLE SLEEVES

[75] Inventor: Mark C. Kilmer, Sr., Southgate, Ky.

[73] Assignee: Goldcrown Machinery, Inc., Cincinnati, Ohio

[21] Appl. No.: 301,359

[22] Filed: Sep. 6, 1994

[51] Int. Cl.⁶ .................................................. B24B 29/00
[52] U.S. Cl. ............................. 451/11; 451/51; 451/244; 451/49
[58] Field of Search ........................... 451/242, 243–245, 451/21, 11, 26, 210, 246, 51, 344–345, 8, 5, 14, 27, 49, 142, 331–333, 339, 406, 408, 51

[56] References Cited

U.S. PATENT DOCUMENTS

| | | | |
|---|---|---|---|
| 1,654,737 | 1/1928 | Kistner | 451/581 |
| 2,260,843 | 10/1941 | Strung | 451/14 |
| 2,810,237 | 10/1957 | Sommer, Jr. | |
| 3,320,702 | 5/1967 | Stahlecker et al. | |
| 3,327,432 | 6/1967 | Lockwood | |
| 3,534,502 | 10/1970 | Lovely | 451/246 |
| 3,553,907 | 1/1971 | Price | 451/331 |
| 3,601,927 | 8/1971 | Kikuchi | 451/244 |
| 3,670,461 | 6/1972 | Hori | 451/333 |
| 3,881,886 | 5/1975 | Hoare | 451/244 |
| 3,954,164 | 5/1976 | Bottomley | 451/244 |
| 4,043,767 | 8/1977 | Suda | 451/244 |
| 4,107,881 | 8/1978 | Jessup | |
| 4,192,102 | 3/1980 | Jessup | |
| 4,471,580 | 9/1984 | Robillard | |
| 4,507,896 | 4/1985 | Smith | |
| 4,562,669 | 1/1986 | Baltzer et al. | |
| 4,599,786 | 7/1986 | Uhtenwoldt | |
| 4,651,472 | 3/1987 | Scheder et al. | 451/244 |
| 4,712,332 | 12/1987 | Smith | |
| 4,896,461 | 1/1990 | Enosawa | 451/244 |

FOREIGN PATENT DOCUMENTS 0248513  7/1969  U.S.S.R. ................. 451/242

Primary Examiner—Bruce M. Kisliuk
Assistant Examiner—Derris Banks
Attorney, Agent, or Firm—Killworth, Gottman, Hagan & Schaeff

[57] ABSTRACT

A grinding wheel is fixedly supported on a machine bed by bearings at each end of the wheel with a friction bearing slide mounted on a swivel plate mounted on the machine bed for movement toward and away from the grinding wheel. A headstock mounted to the slide rotates a cantilevered grinding arbor such that the slide is moved toward the grinding wheel for simultaneously grinding multiple sleeves axially received on the arbor. Sleeves are automatically handled by a first arbor mounted to a sleeve conveyor trolley for unfinished sleeves and a second arbor also mounted to the trolley for finished sleeves. The trolley is operated to deposit finished sleeves and pick up unfinished sleeves on one side of the system, and to pick up finished sleeves and position unfinished sleeves for grinding on the other side of the system. Finished sleeves are deposited onto a pivotally mounted finished sleeve receiving arbor when the arbor is pivoted to a first position. When pivoted to a second position, the finished sleeve receiving arbor cooperates with a first gripper which moves finished sleeves to a gauging station. A second gripper then moves the finished sleeves to a conveyor where they are sorted based on measurements made on the finished sleeves by the gauging system. Sleeve handling fingers move sleeves among the various arbors to move the sleeves within the grinding system. The grinding wheel is periodically dressed in response to measurement signals generated by the gauging system.

21 Claims, 12 Drawing Sheets

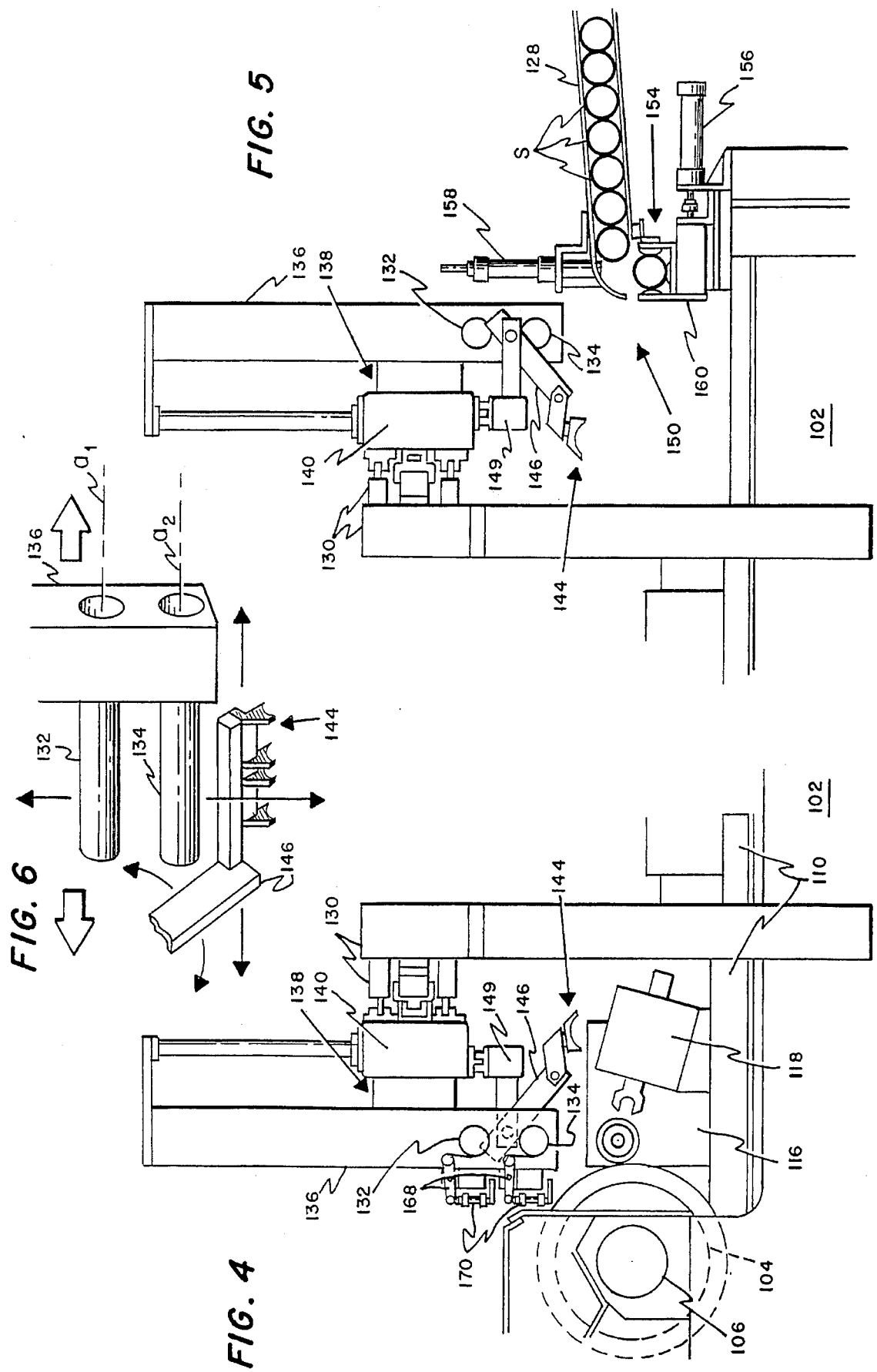

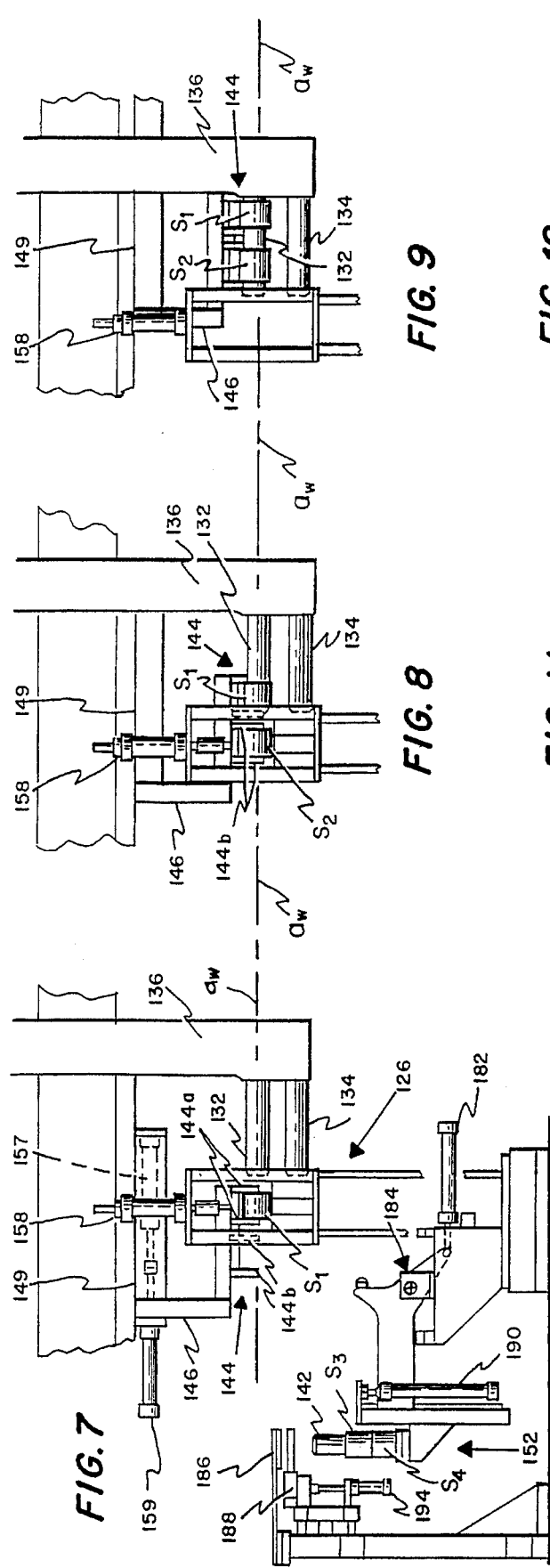

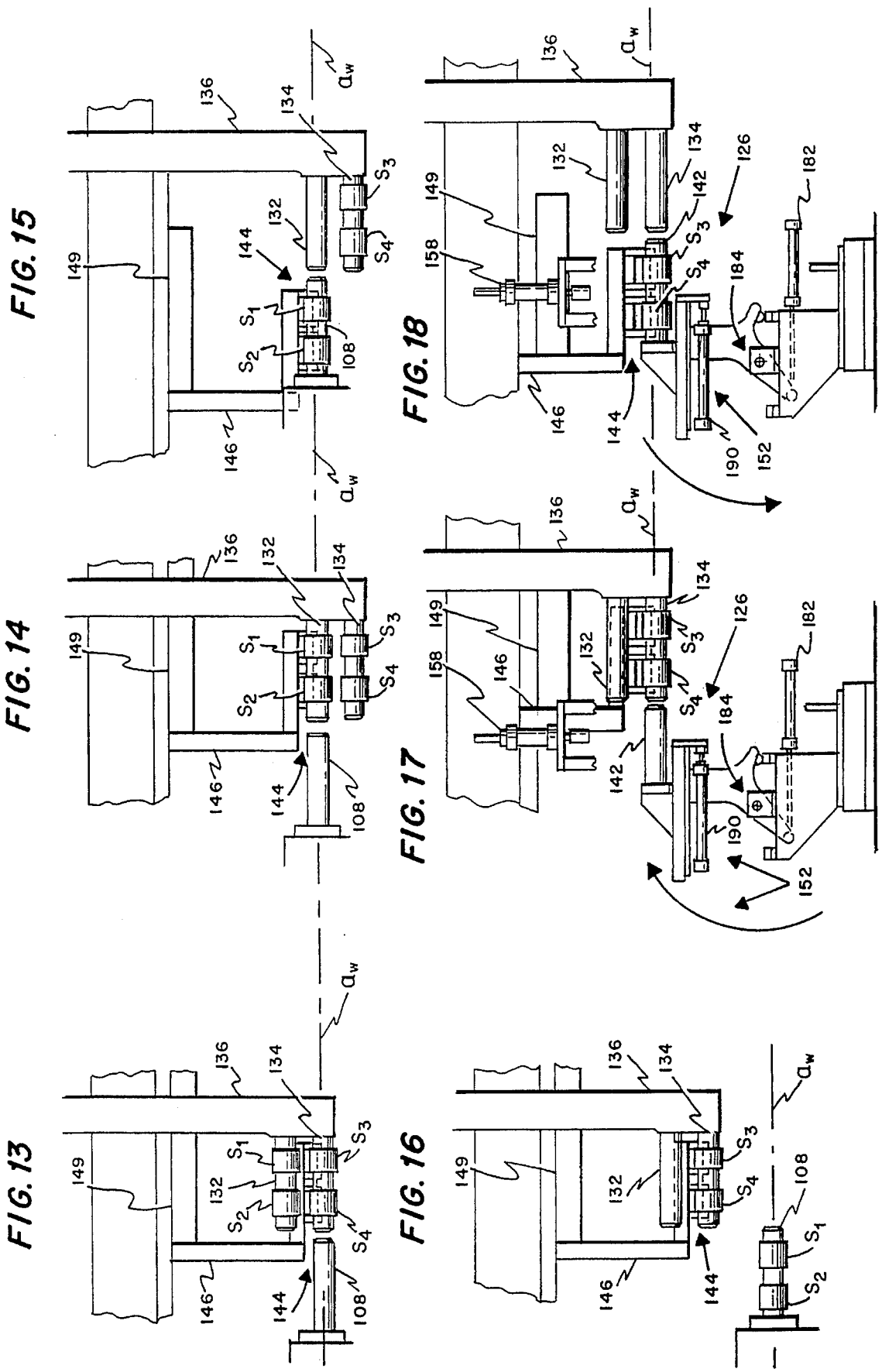

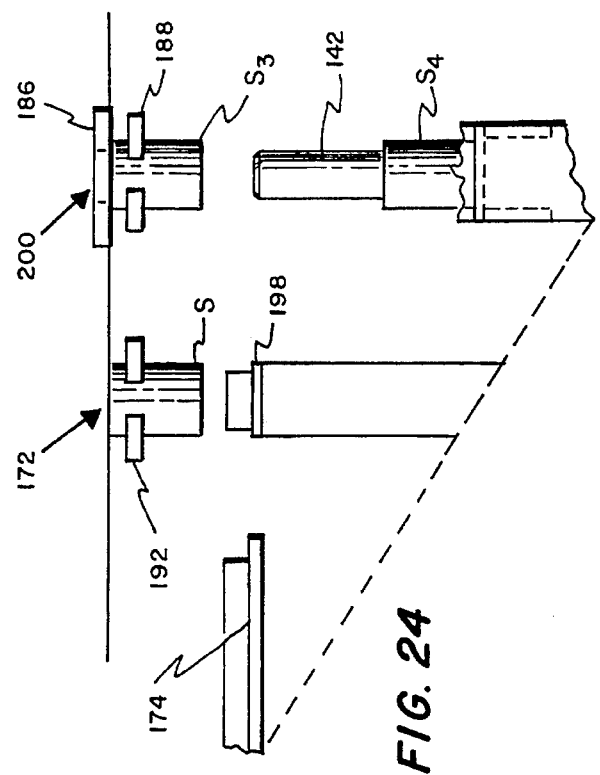
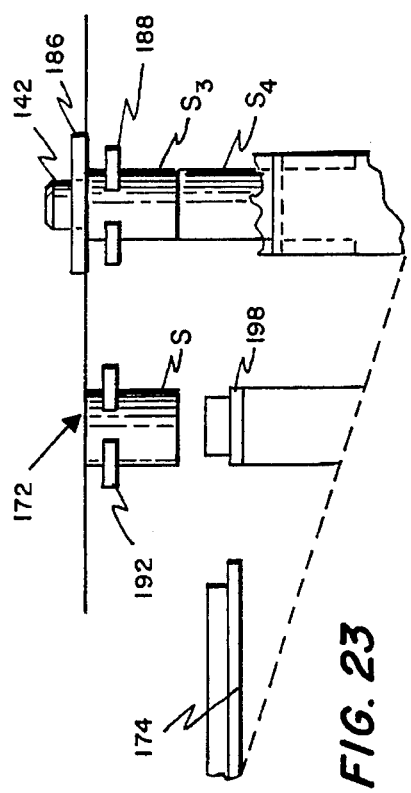
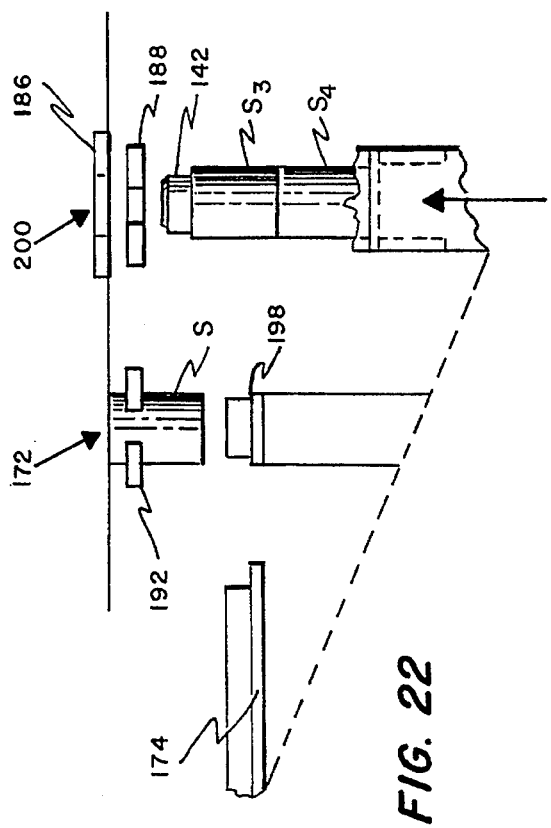

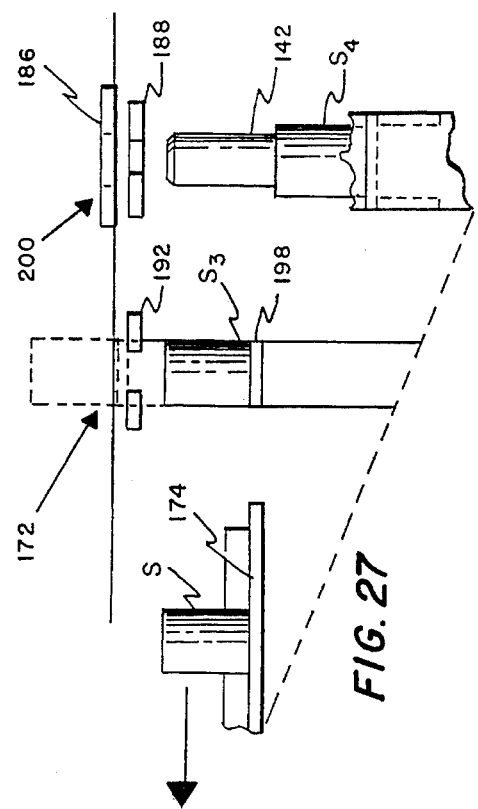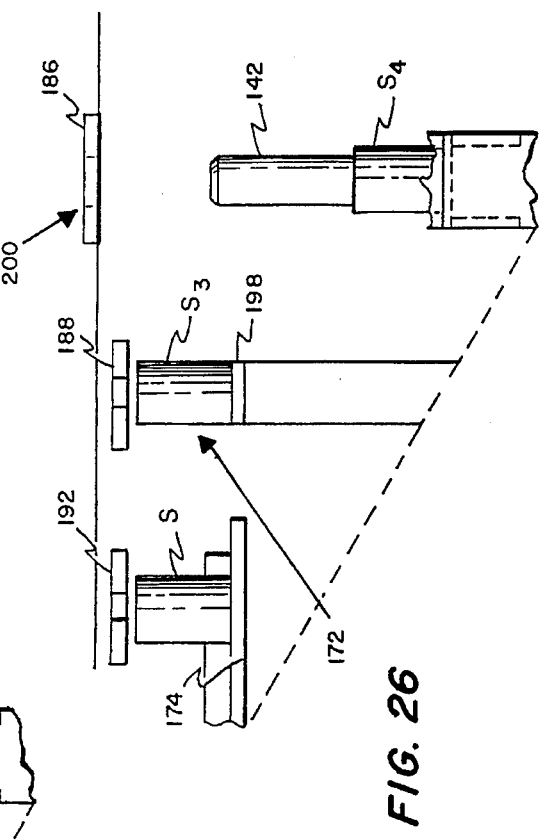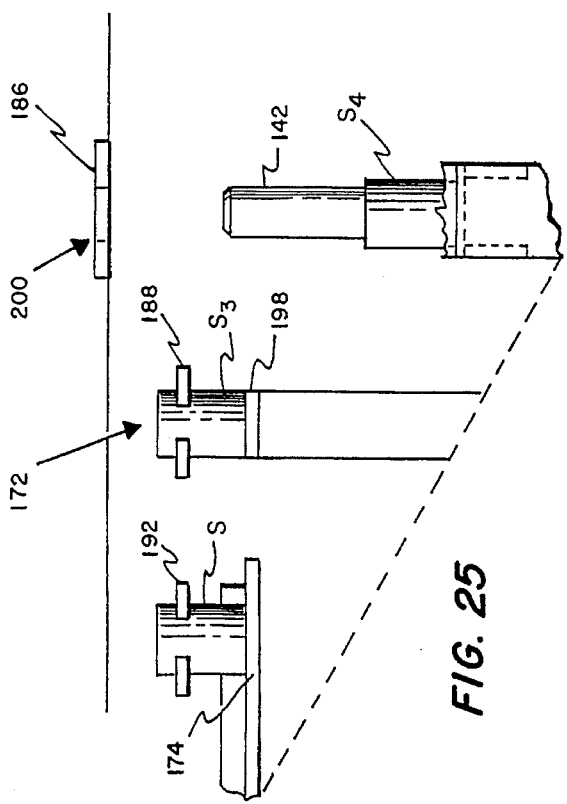

METHOD AND APPARATUS FOR SIMULTANEOUSLY GRINDING MULTIPLE SLEEVES

BACKGROUND OF THE INVENTION

The present invention relates in general to sleeve grinding and, more particularly, to a method and apparatus for simultaneously grinding multiple axially aligned sleeves. While the present invention is generally applicable to sleeve grinding, it is particularly applicable to grinding cylinder liners for internal combustion engines and will be described herein with reference to this application. Accordingly, sleeve and liner may be used interchangeably herein.

Currently, cylinder liners for internal combustion engines are ground one liner at a time. A liner to be ground is mounted onto an arbor and a rotating grinding wheel is moved into engagement with the outside of the cylinder liner, which is also rotating, until the cylinder liner is ground to a precision outer diameter. The outer diameter is critical for proper placement in an engine block. The prior art grinding wheels are mounted to a sliding bed or are pivotally mounted for movement into engagement with the cylinder liner and are cantilever supported such that the size of the grinding wheel and hence the number of cylinder liners which can be ground at one time is limited.

Accordingly, there is a need to simultaneously grind multiple cylinder liners for increased production and reduced cost. For optimizing the cylinder liner grinding operation, preferably the cylinder liners would be automatically handled by a compact sleeve handling system which loads unfinished liners to be ground, removes finished liners after grinding, gauges the finished liners, transports acceptably ground liners to an acceptable liner area and rejects the occasional liner which is unacceptably ground by the grinding operation. Also, the grinding wheel of the grinding system should be dressed on a periodic basis to provide better performance from the grinding machine.

SUMMARY OF THE INVENTION

This need is met by the invention of the present application wherein a controllably rotatable grinding wheel is supported on a machine bed along a fixed axis by bearings at each end of the wheel. The fixed mounting provides stable support for the grinding wheel which is of sufficient width to grind multiple sleeves simultaneously. A friction bearing slide is mounted on a swivel plate on the machine bed for movement toward and away from the grinding wheel with the swivel plate providing rotational adjustment of the slide relative to the machine bed. A headstock for rotating a cantilevered grinding arbor is mounted to the slide such that the slide can be moved toward the grinding wheel for engaging simultaneously multiple sleeves axially received on the grinding arbor with the grinding wheel for precision grinding of the outer surfaces of the sleeves.

Sleeves are automatically handled in accordance with the present invention wherein multiple unfinished sleeves are passed to a sleeve conveying first arbor mounted to a sleeve conveyor trolley. A sleeve conveying second arbor, for handling finished sleeves, is also mounted to the sleeve conveyor trolley. The trolley is operated to deposit finished sleeves and pick up unfinished sleeves on one side of the system, and to pick up finished sleeves and position unfinished sleeves for grinding on the other side of the system. This provides a compact handling arrangement wherein the sleeves are conveyed over the top of the grinding system.

Finished sleeves are deposited onto a pivotally mounted finished sleeve receiving arbor when the arbor is pivoted to a first position. When pivoted to a second position, the finished sleeve receiving arbor cooperates with a first gripper which moves the sleeves to a gauging station. A second gripper then moves the finished sleeves from the gauging station to a conveyor where they are sorted based on measurements made on the finished sleeves by gauging equipment at the gauging station. Sleeve handling fingers move sleeves among the various arbors to properly move the sleeves within the grinding system.

The grinding wheel must be periodically dressed to maintain proper tolerances on the finished sleeves. In accordance with the present invention, the dressing operations are performed in response to measurement signals generated by the gauging system. In this way, variations within the grinding system due, for example to minor deformations of the grinding arbor during grinding operations, can be better corrected and compensated. Trends of the measurement signals are used for the grinding wheel dressing operations such that ongoing changes within the grinding system can be corrected. Measurement of such trends also assists in performing maintenance and anticipating operating problems within the grinding system.

In accordance with a first aspect of the present invention, a grinding system for simultaneously grinding multiple sleeves in a single grinding operation comprises a fixed machine bed having a grinding wheel mounted thereon. The wheel is mounted for controlled rotation about a fixed axis defined by bearings at each end of the wheel and is of sufficient width to simultaneously grind all of the multiple sleeves with the multiple sleeves being axially aligned with one another. A friction bearing slide is mounted upon the machine bed for movement toward and away from the grinding wheel in a direction generally perpendicular to the fixed axis of the wheel. A headstock is mounted to the slide and cantilever supports a grinding arbor from the arbor's proximal end. The grinding arbor supports multiple sleeves with axes of the multiple sleeves being collinear along the grinding arbor and parallel to the fixed axis of the grinding wheel. A retractable steady rest engages the distal end of the grinding arbor during grinding operations and a servo drive connected between the machine bed and the friction bearing slide moves the slide upon the machine bed toward and away from the grinding wheel. The friction bearing slide may be mounted on a swivel plate on the machine bed for rotational movement of the slide to align the grinding with the grinding wheel.

Preferably, the grinding system further comprises a sleeve handler system for removing finished sleeves from the grinding arbor and loading unfinished sleeves onto the grinding arbor. The sleeve handler system comprises a sleeve conveyor trolley having a first conveyor arbor for carrying unfinished sleeves and a second conveyor arbor for carrying finished sleeves. Sleeve handling fingers associated with the sleeve conveyor trolley move sleeves onto and off of the first and second conveyor arbors by movement toward and away from the first and second conveyor arbors and parallel to axes of the first and second conveyor arbors. The conveyor arbors are mounted for vertical movement on the sleeve conveyor trolley. Unfinished sleeves to be ground by the grinding system are loaded onto the first conveyor arbor at a sleeve loader station while finished sleeves are removed from the second arbor at a sleeve removal station. The sleeve removal station and the sleeve loader station define a first sleeve handling station and the sleeve conveyor trolley moves the first and second conveyor arbors between the first sleeve handling station and a second sleeve handling station adjacent the distal end of the grinding arbor.

The first and second conveyor arbors are vertically movable between a travel position, an unfinished sleeve handling position and a finished sleeve handling position. In the illustrated embodiment, the sleeve unloading station includes a pivotally mounted finished sleeve receiving arbor. The finished sleeve receiving arbor is pivoted to a first position for receiving finished sleeves from the second conveyor arbor and to a second position for removing finished sleeves from the finished sleeve receiving arbor. The sleeve loader station comprises a sleeve loader sled movable between a sleeve receiving position and a sleeve delivery position with the sleeve handling fingers being operable with the sleeve loader sled to move multiple unfinished sleeves onto the first conveyor arbor.

In the illustrated embodiment, the sleeve loader sled moves individual sleeves from the sleeve receiving position to the sleeve delivery position. For this embodiment, the sleeve handling fingers are moved in steps to move individual sleeves in seriatim onto the first conveyor arbor and thereby move multiple unfinished sleeves onto the first conveyor arbor. The first position of the finished sleeve receiving arbor orients the finished sleeve receiving arbor substantially horizontal and the second position of the finished sleeve receiving arbor orients the finished sleeve receiving arbor substantially vertical.

Preferably, the grinding system further comprises a sleeve gauging system for measuring finished sleeves and generating signals representative of measurements of finished sleeves. A first gripper is provided for carrying finished sleeves from the sleeve unloading station to the sleeve gauging system. The sleeve receiving arbor is vertically movable when in the second, substantially vertical position for moving finished sleeves on the finished sleeve receiving arbor through the first gripper for engagement by the first gripper. An exit conveyor carries finished sleeves from the grinding system, and a second gripper carries finished sleeves from the sleeve gauging system to the exit conveyor.

Preferably, the grinding system comprises a grinding wheel dressing system responsive to signals generated by the gauging system for dressing the grinding wheel to compensate for errors in finished sleeves resulting from characteristics of the grinding system. The gauging system generates signals representative of error trends in finished sleeves and generates trend signals for controlling the grinding wheel dressing system.

In the illustrated embodiment of the grinding system, the first sleeve handling station is positioned on a first side of the grinding system and the second sleeve handling station is positioned on a second side of the grinding system opposite to the first side. For this embodiment, the sleeve conveyor trolley moves between the first and second sides of the grinding system over the top of the grinding system to move between the first sleeve handling station and the second sleeve handling station.

In accordance with another aspect of the present invention, a method for simultaneously grinding multiple sleeves in a single grinding operation comprises the steps of: rotating a grinding wheel fixedly mounted upon a machine bed for controlled rotation about a fixed axis defined by bearings at each end of the wheel, the wheel being sufficiently wide to simultaneously grind all of the multiple sleeves with the multiple sleeves being axially aligned; mounting a friction bearing slide on the machine bed for movement of the slide toward and away from the grinding wheel in a direction generally perpendicular to the fixed axis; rotating a headstock mounted to the slide; supporting multiple sleeves axially collinear on a grinding arbor having a distal end and a proximal end mounted to the headstock to cantilever support the grinding arbor parallel to the fixed axis of the grinding wheel; engaging a retractable steady rest with the distal end of the grinding arbor during grinding operations; moving the slide upon the machine bed toward the grinding wheel for grinding multiple sleeves on the grinding arbor; retracting the steady rest; and, moving the slide upon the machine bed away from the grinding wheel for loading and unloading the grinding arbor.

The method preferably further comprises the steps of: carrying unfinished sleeves from a sleeve loader station to a sleeve handling station adjacent the grinding arbor on a first conveyor arbor supported upon a sleeve conveyor trolley; unloading finished sleeves from the grinding arbor onto a second conveyor arbor supported upon the sleeve conveyor trolley; loading unfinished sleeves from the first conveyor arbor onto the grinding arbor; and, carrying finished sleeves on the second conveyor arbor onto a sleeve removal station.

In addition, the method may further comprise the steps of: unloading finished sleeves from the second conveyor arbor onto a finished sleeve receiving arbor in a sleeve removal station; and, loading unfinished sleeves from a sleeve loader sled in the sleeve loader station onto the first conveyor arbor. Preferably, the method further comprises the steps of: moving finished sleeves from the sleeve removal station to a sleeve gauging system; gauging finished sleeves; and, generating signals representative of measurements taken by the gauging system. When gauging is performed, the method preferably further comprises the steps: of accepting finished sleeves based on measurement signals generated by the gauging system; and, dressing the grinding wheel based on measurement signals generated by the gauging system. To ensure that the proper positioning of the sleeves is maintained on the first and second conveyor arbors during movement of the first and second arbors, the method may further comprise the step of clamping the sleeves to the first and second conveyor arbors during movement.

It is, thus, an object of the present invention to provide an improved method and apparatus for grinding simultaneously multiple sleeves, such as cylinder liners; to provide an improved method and apparatus for grinding simultaneously multiple sleeves which are automatically handled during the grinding operation; and, to provide an improved method and apparatus for grinding simultaneously multiple sleeves which are thereafter measured by a gauging system to identify acceptable sleeves and to control dressing of a grinding wheel to account for errors produced by characteristics of the grinding operation.

Other objects and advantages of the invention will be apparent from the following description, the accompanying drawings and the appended claims.

BRIEF DESCRIPTION OF THE DRAWINGS

FIG. 4 is a portion of the left side view of FIG. 2 showing a sleeve conveyor trolley in its raised, travel position;

FIG. 5 is a portion of the right side view of FIG. 3 showing the sleeve conveyor trolley in its raised, travel position;

FIG. 6 is a perspective view illustrating the relative movement of sleeve handling fingers and first and second conveyor arbors which are mounted to the sleeve conveyor trolley;

FIGS. 7–9 are broken away views taken along view line 7—7 from the back of the sleeve grinding system of FIGS. 1A and 1B (FIG. 1A) showing unfinished sleeves being loaded into the system in a first sleeve handling station;

FIG. 10 is a broken away view taken from the back of the sleeve grinding system of FIGS. 1A and 1B showing unfinished sleeves being conveyed from the first sleeve handling station to a second sleeve handling station;

FIGS. 11–13 are broken away views taken along view line 11—11 from the back of the sleeve grinding system of FIGS. 1A and 1B (FIG. 1B) showing finished sleeves which have been ground being removed from a grinding arbor in the second sleeve handling station;

FIGS. 14 and 15 are broken away views taken along view line 11—11 from the back of the sleeve grinding system of FIGS. 1A and 1B (FIG. 1B) showing unfinished sleeves being loaded onto the grinding arbor at the second sleeve handling station;

FIG. 16 is a broken away view taken from the back of the sleeve grinding system of FIGS. 1A and 1B showing finished sleeves which have been ground being raised on a sleeve conveyor trolley for conveyance from the second sleeve handling station to the first sleeve handling station;

FIGS. 17 and 18 are broken away view taken along view line 11—11 from the back of the sleeve grinding system of FIGS. 1A and 1B (FIG. 1B) showing finished sleeves being loaded onto a pivoting arbor at the first sleeve handling station, thus, FIGS. 7–18 together illustrate sleeve handling within the sleeve grinding system of FIGS. 1A and 1B by means of the conveyor arbors, a pivoting arbor and the sleeve handling fingers;

FIGS. 22–30 are broken away views taken along the view line 22—22 from the left side of the sleeve grinding system of FIGS. 1A and 1B (FIG. 1B) showing conveyance of finished sleeves through a gauging station to an exit conveyor;

DETAILED DESCRIPTION OF THE INVENTION

Figure 1A:
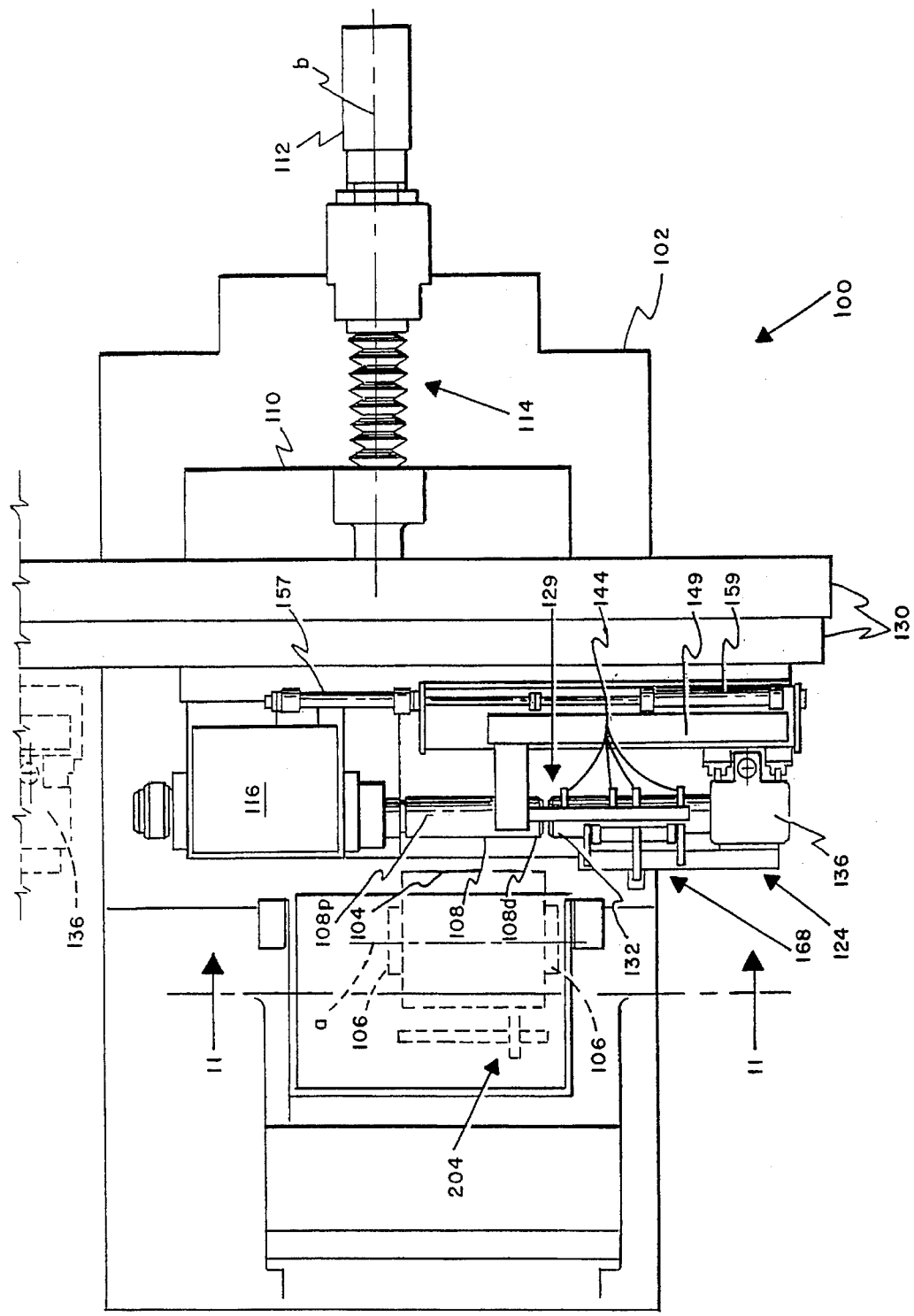
FIGS. 1A and 1B when combined illustrate a plan view of a sleeve grinding system in accordance with the present invention and may be referred to herein collectively as FIG. 1.
Figure 1B:
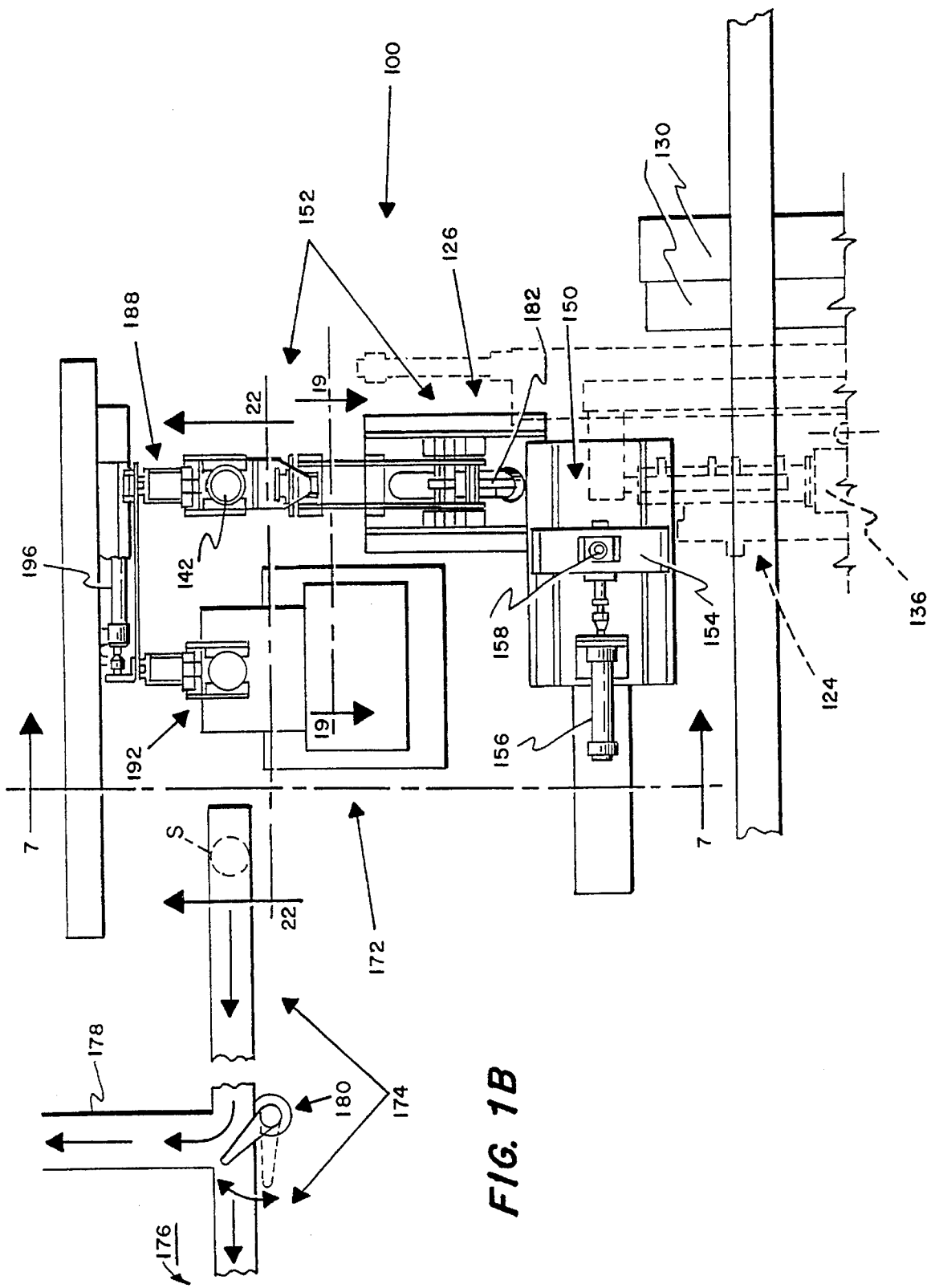

The invention of the present application will now be described with reference to the drawings. FIGS. 1 (FIGS. 1A and 1B combined), 2 and 3 provide plan, left side and right side views, respectively, of a sleeve grinding system 100 operable in accordance with the present invention. The same parts of the sleeve grinding system 100 will be identified by the same numerals throughout the drawings and it is noted that different parts and portions of the sleeve grinding system 100 have been removed in various ones of the drawings for ease of illustration and clarity of description. While the present invention is generally applicable to grinding all varieties of hollow sleeves, its initial application is to grind sleeve liners for internal combustion engines. Accordingly, it will be described with reference to this application and the elements which are ground may be referred to interchangeably as sleeves and liners during the description.

The grinding system 100 is designed to simultaneously grind multiple sleeves, such as cylinder liners for internal combustion engines, two sleeves being ground at one time in the embodiment illustrated herein. The grinding system 100 comprises a fixed machine bed 102 to which a grinding wheel 104 is fixedly mounted between bearings 106 which define a fixed axis a for the grinding wheel 104. As will become apparent, the grinding wheel 104 is sufficiently wide to grind multiple sleeves or cylinder liners, two as illustrated, when the liners are mounted on a grinding arbor 108 in axial alignment with one another and the grinding arbor 108.

A friction bearing slide 110 is mounted upon a swivel plate 111 which is mounted on the machine bed 102 with the swivel plate 111 allowing the slide 110 to be pivoted to square the slide with the grinding wheel 104 as necessary. The slide 110 is mounted for movement toward and away from the grinding wheel 104 along an axis b generally perpendicular to the fixed axis a of the grinding wheel 104. Movement of the slide 110 is controlled by a servo-motor 112 through a precision screw servo drive 114 such that movement of the slide 110 can be precisely regulated. A headstock 116 is fixedly mounted to the slide 110 for controlled rotation of the grinding arbor 108.

The proximal end 108p of the grinding arbor 108 is mounted for cantilever support from the headstock 116. The grinding arbor 108 is preferably a hydraulic locking arbor which includes expandable portions for expanding under the control of pressurized hydraulic fluid to lock sleeves to be ground to the grinding arbor 108 in axial alignment with the grinding arbor 108. Of course, other locking arbors can be used in the present invention and several varieties of locking arbors are commercially available for this purpose. The distal end 108d of the grinding arbor 108 is engaged by a commercially available retractable steady rest 118 to support and stabilize the grinding arbor 108 during grinding operations, i.e., as sleeves collinearly mounted on the grinding arbor 108 are forced into the grinding wheel 104 by movement of the slide 110.

Figure 31:
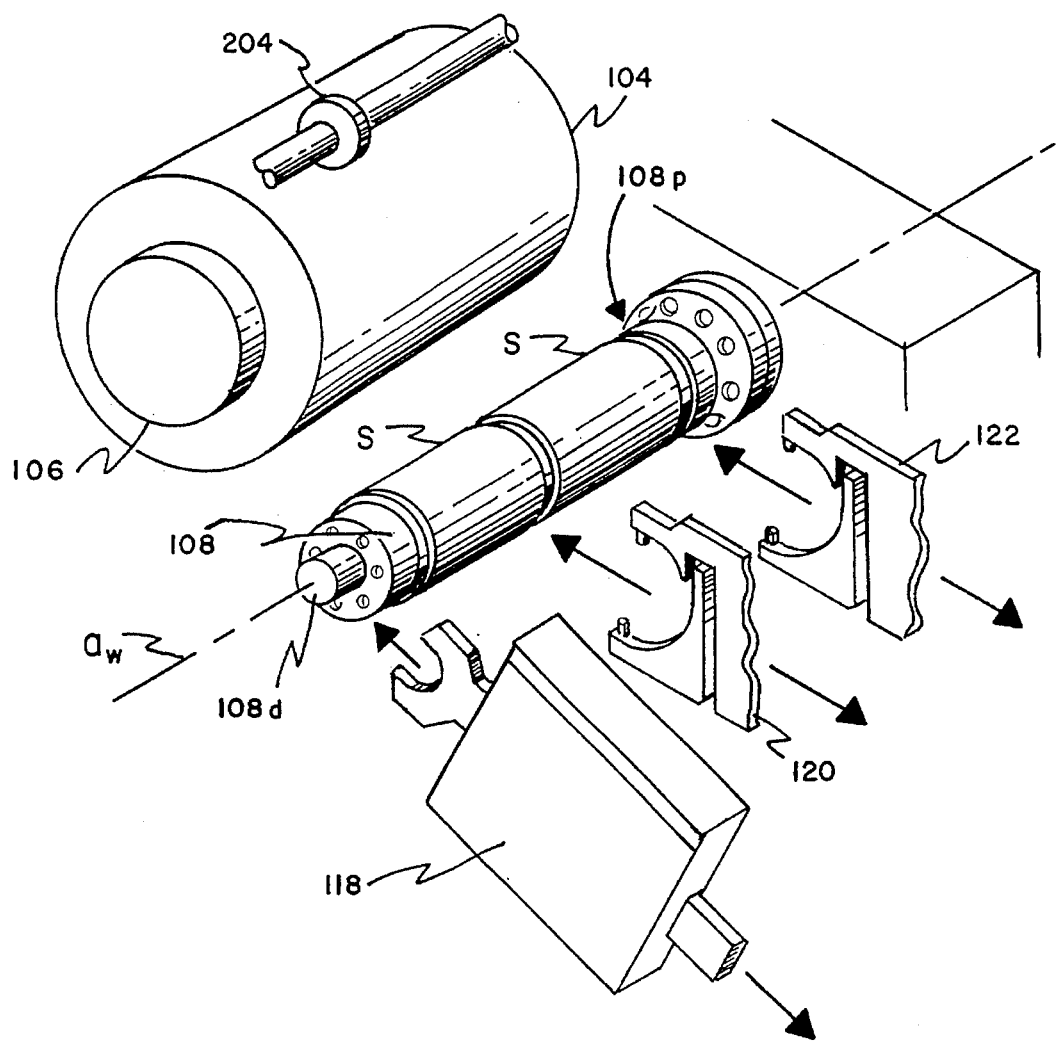
FIG. 31 is a perspective view of a grinding wheel, grinding arbor, dressing wheel, in process gauges and a steady rest as generally utilized in the grinding system of FIGS. 1A and 1B.

The grinding wheel 104, bearings 106, grinding arbor 108 and steady rest 118 are shown in an exploded perspective view in FIG. 31. In addition, FIG. 31 shows in-process gauges 120, 122 which are extended to engage the sleeves s on the grinding arbor 108 as the sleeves s are being ground. The in-process gauges 120, 122 help ensure the accuracy of the grinding operation and thereby the size of the part outside diameter. The gauges 120, 122 operate in conjunction with and in response to signals generated at a gauging station wherein finished sleeves s, which have been ground, are measured to determine the accuracy of the grinding operation as well as other machining operations which have been performed on the sleeves s prior to being passed to the grinding system 100.

With this understanding of the basic sleeve grinding operation in accordance with the broadest aspect of the present invention, a sleeve handling system of the grinding system 100 will now be described with reference to the drawings. The sleeve handling system comprises a sleeve conveyor trolley 124 which is moved between a first sleeve handling station 126 where finished sleeves which have been ground are removed and unfinished sleeves which are to be ground are loaded into the system from a sleeve feeder 128 as shown in FIGS. 3, 5 and 19–21, and a second sleeve handling station 129 adjacent the distal end 108*d* of the grinding arbor 108 where finished sleeves are removed from the grinding arbor 108 and unfinished sleeves are loaded onto the grinding arbor 108.

The positioning of the sleeve conveyor trolley 124 in the first sleeve handling station 126 is shown in FIG. 1 by a dashed line drawing (FIG. 1B) and in the second sleeve handling station 129 by a solid line drawing (FIG. 1A). It is apparent from FIG. 1 that the first and second sleeve handling stations 126, 129 are on opposite sides of the main grinding portion of the system 100 which is generally defined by the machine bed 102. The sleeve conveyor trolley 124 is supported upon a support rail 130 which is in turn fixedly supported from the machine bed 102 and the sleeve conveyor trolley 124 is moved back and forth along the support rail 130 by a drive mechanism (not shown) which is mounted within the support rail 130. The sleeve conveyor trolley 124 passes over the top of the main grinding portion of the system 100 in traveling back and forth between the first and second sleeve handling stations 126, 129 which makes the sleeve handling system relatively compact in terms of floor space which it occupies since a large portion of that space is common to the machine bed 102.

Figure 2:
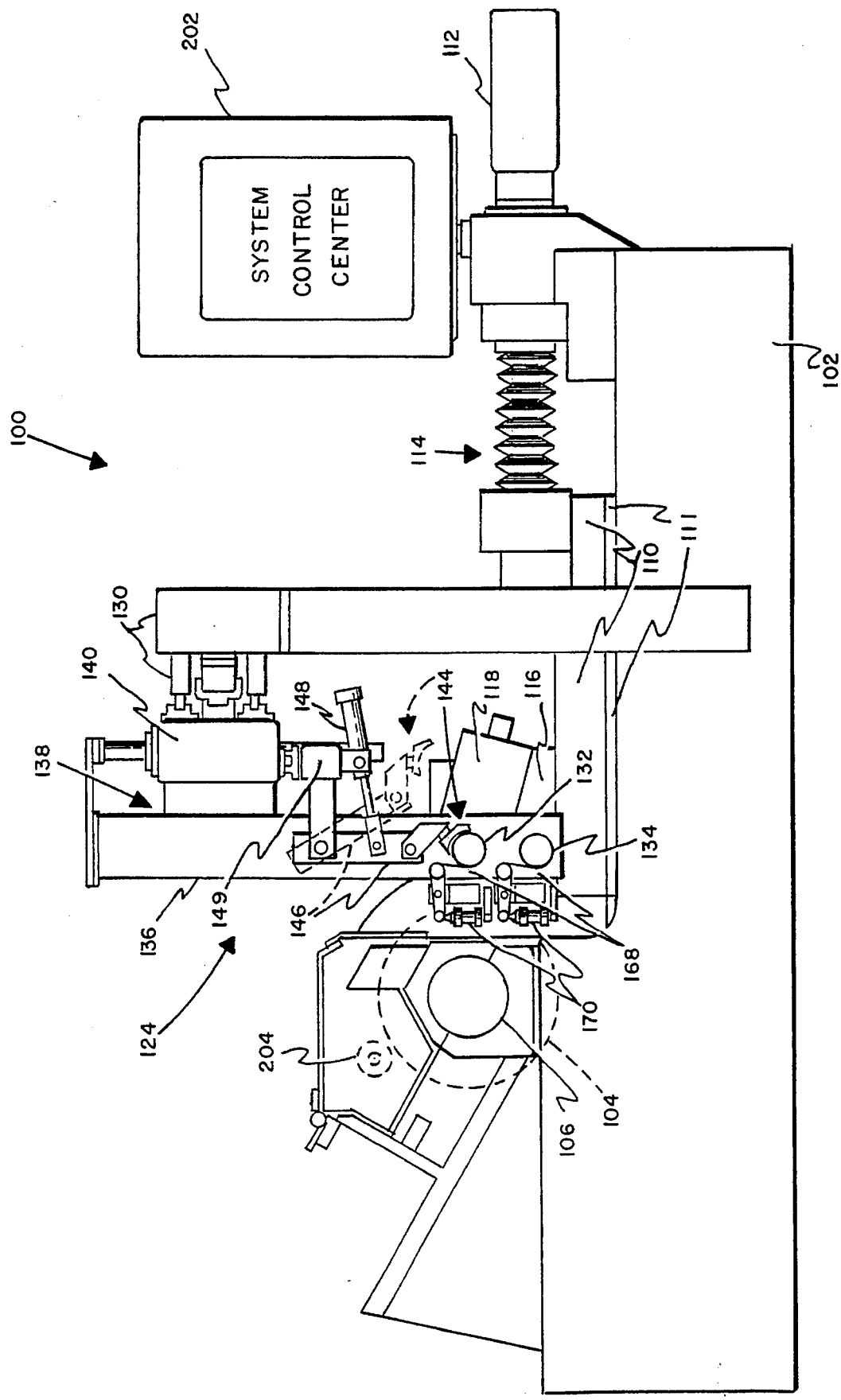
FIG. 2 is a left side view of the sleeve grinding system of FIGS. 1A and 1B.
Figure 3:
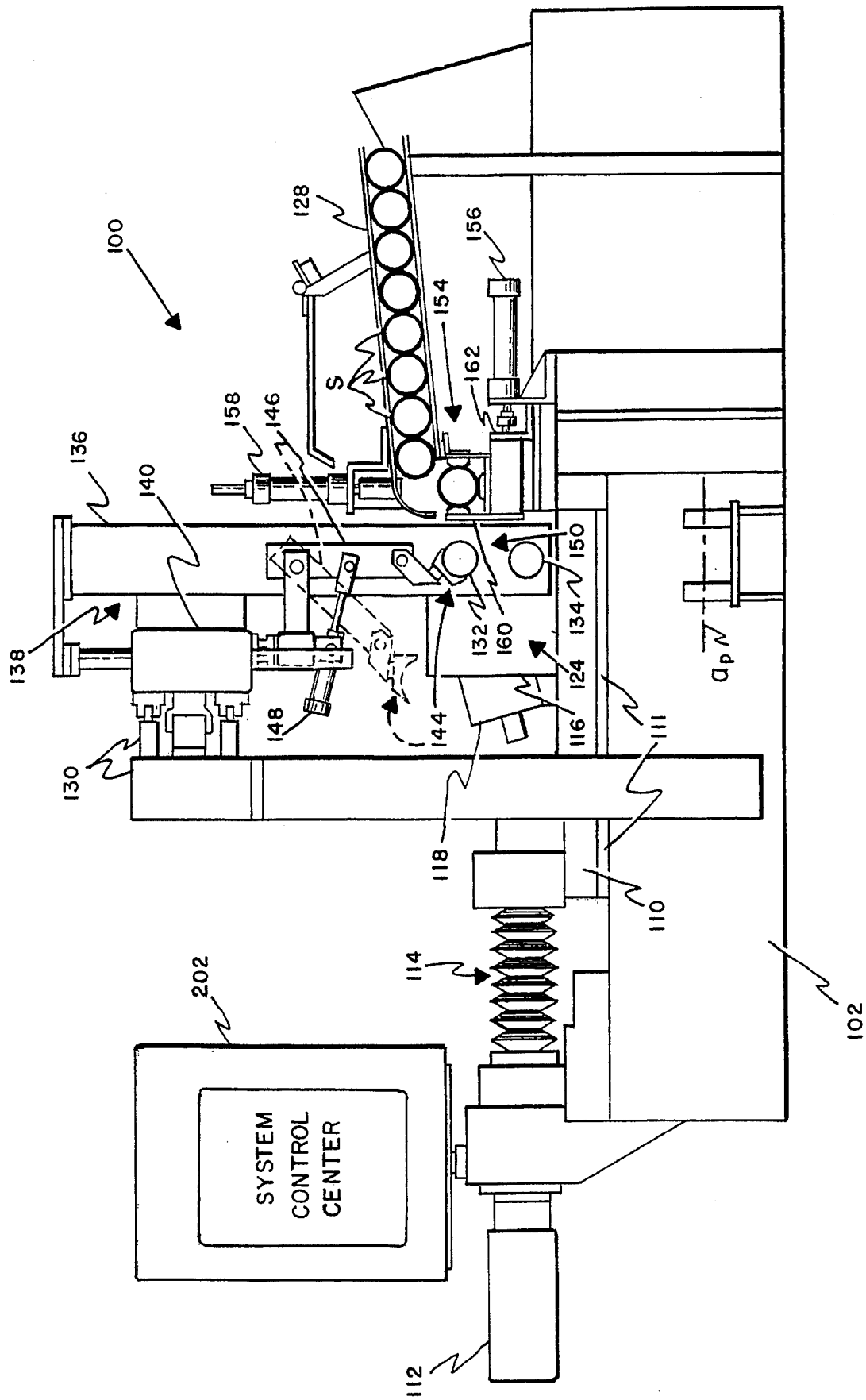
FIG. 3 is a right side view of the sleeve grinding system of FIGS. 1A and 1B.

The sleeve conveyor trolley 124 includes a first conveyor arbor 132 for carrying unfinished sleeves and a second conveyor arbor 134 for carrying finished sleeves. The first and second conveyor arbors 132, 134 are spaced from one another and extend in a generally horizontal orientation from a vertically oriented conveyor arbor support member 136. The support member 136 is in turn supported for vertical movement upon the sleeve conveyor trolley 124 by a slide rail 138 and is vertically moved along the slide rail 138 by tandem hydraulic cylinders 140. The conveyor arbors 132, 134 and the conveyor arbor support member 136 are shown in their fully lowered position in FIGS. 2 and 3 and in their fully raised, travel position in FIGS. 4 and 5.

When the conveyor arbor support member 136 is in its fully lowered position, the first conveyor arbor 132 is positioned coaxially with a work axis $a_w$ which generally passes through the grinding arbor 108 and a pivoting arbor 142 when the pivoting arbor 142 is in its horizontal position as will be later described, see FIGS. 7–9. When the conveyor arbor support member 136 is in its fully raised, travel position, it can be moved back and forth across the main grinding portion of the system 100.

The conveyor arbor support member 136 can also be moved to an intermediate position wherein the second conveyor arbor 134 is positioned coaxially with the work axis $a_w$, see FIGS. 11–13, 17 and 18. The fully lowered position of the conveyor arbor support member 136 is an unfinished sleeve handling position and the intermediate position of the conveyor arbor support member 136 is a finished sleeve handling position.

Sleeve handling fingers 144 are mounted on the sleeve conveyor trolley 124 for moving sleeves s onto and off of the first and second conveyor arbors 132, 134. The sleeve handling fingers 144 are supported on the sleeve conveyor trolley 124 by a pivotally mounted arm 146 for movement toward and away from the first and second conveyor arbors 132, 134 under the control of a pneumatic cylinder 148. The arm 146 is pivotally mounted to a support frame 149 which is mounted for generally horizontal movement parallel to axes $a_1$, $a_2$ of the first and second conveyor arbors 132, 134 which, as previously mentioned, are mounted for vertical movement on the sleeve conveyor trolley 124. The support frame 149 is moved by tandem hydraulic cylinders 157, 159 to thereby horizontally move the sleeve handling fingers 144.

When the sleeve handling fingers 144 are pivoted to their extended position shown in FIGS. 1A–3, 8, 9, 11–15, 17 and 18, they form sleeve receiving arches which are generally centered on the work axis $a_w$. The sleeve receiving arches in turn define facing pairs of arcuate shoulders for engaging ends of the sleeves s and axially moving the sleeves s within the grinding system 100. Sleeve movement within the grinding system 100 will be more fully described herein. When the sleeve handling fingers 144 are pivoted to their retracted, travel position shown in FIGS. 2 and 3, in dotted lines, 4–6, 10, 16 and 21, they can be moved back and forth across the main grinding portion of the system 100.

The retracted position of the sleeve handling fingers 144 also permits the conveyor sleeve support member 136 and thereby the sleeve conveyor arbors 132, 134 to be raised and lowered as shown in FIG. 6 wherein the conveyor sleeve support member 136 is shown in its raised, travel position. While the sleeve handling fingers 144 can be pivoted on the sleeve conveyor trolley 124, they are not otherwise vertically movable as is the conveyor arbor support member 136.

The first sleeve handling station 126 comprises a sleeve loader station 150, into which unfinished sleeves to be ground are fed by the sleeve feeder 128 as shown in FIGS. 3, 5 and 19–21; and, a sleeve removal station 152, from which finished sleeves which have been ground are removed. To the extent that the sleeve handling fingers 144 are used to perform both these functions with regard to the first and second conveyor arbors 132, 134, respectively, the sleeve loader station 150 and the sleeve removal station 152 overlap and coincide with one another as will become apparent.

The sleeve loader station 150 will be described first with primary reference to FIGS. 19–21 which show a sleeve loader sled 154 which is moved between a sleeve receiving position shown in FIGS. 3, 5, 19 and 21, and a sleeve delivery position shown in FIGS. 7–9 (note that the sleeve loader sled 154 is not shown in FIGS. 7–9 since it would block a clear view of the sleeve handling operations described) and FIG. 20 by a pneumatic cylinder 156. Sleeves fed from the sleeve feeder 128 are under the control of a pneumatic cylinder 158 and the sleeve loader sled 154 itself.

Figure 21:
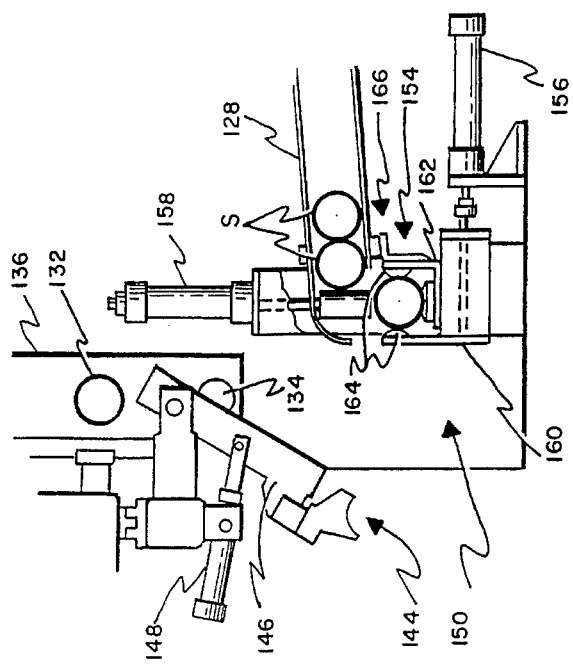
FIGS. 19–21 taken along view line 19—19 from the right side of the sleeve grinding system of FIGS. 1A and 1B (FIG. 1B) illustrate loading unfinished sleeves onto a first conveyor arbor to be carried to a grinding arbor of the grinding system of FIGS. 1A and 1B.
Figure 20:
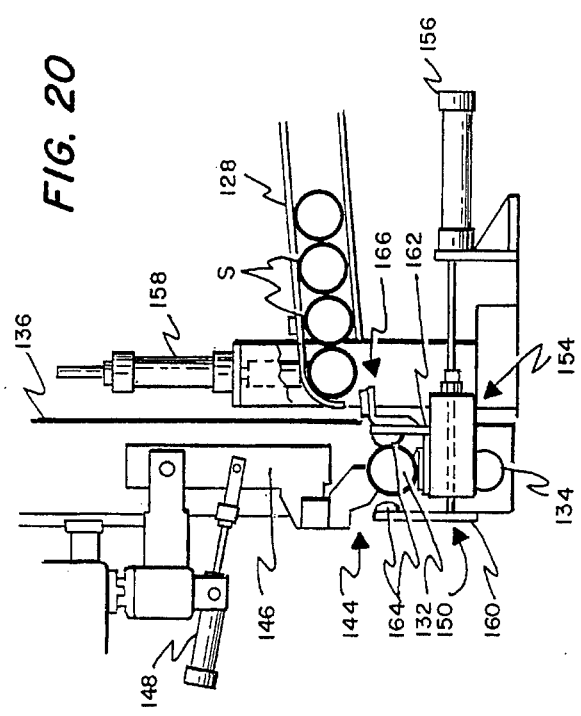
Figure 19:
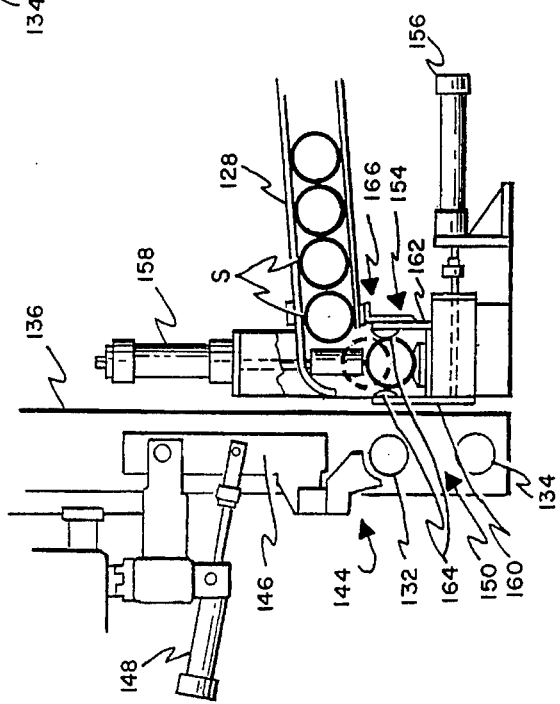

As best shown in FIGS. 19–21, the sleeve loader sled 154 includes a movable front wall 160 to which an extendable rod from the pneumatic cylinder 156 is secured and a back wall 162. Resilient sleeve supporting extensions 164 extend inwardly from the front and back walls 160, 162 to support an unfinished sleeve s as it comes from the sleeve feeder 128, see the dashed line sleeve in FIG. 19. The pneumatic cylinder 158 is extended to force sleeves s into the sleeve loader sled 154.

The front wall 160 is movably supported relative to the remainder of the sleeve loader sled 154 by the control rod of the pneumatic cylinder 156 such that it is moved outwardly by the pneumatic cylinder 156 to provide clearance for the sleeve handling fingers 144 as sleeves are loaded in seriatim onto the first conveyor arbor 132 from the sleeve loader sled 154, see FIG. 20.

Sleeves can be retained in the sleeve feeder 128 either by not fully retracting the pneumatic cylinder 158 after a sleeve s has been forced into the sleeve loader sled 154 or by means of an extension 166 on an upper portion of the back wall 162. In any event, single sleeves are inserted into the sleeve loader sled 154 for being loaded onto the grinding arbor 108 by means of the first conveyor arbor 132. Handling of sleeves within the grinding system 100 will now be described with reference particularly to FIGS. 7–21.

As shown in FIGS. 7 and 19, the conveyor arbor support member 136 of the sleeve conveyor trolley 124 is positioned at the first sleeve handling station 126 and has been moved to its fully lowered position such that the first conveyor arbor 132 is positioned adjacent to the sleeve loader sled 154 and axially aligned with the work axis $a_w$. A sleeve s has been forced into the sleeve loader sled 154 by the pneumatic cylinder 158 and the fingers 144 have been positioned adjacent to the conveyor arbor 132.

A review of the fingers 144, for example in FIG. 6, shows that there are four fingers for handling two sleeves, i.e., each sleeve is engaged at its ends by a pair of the fingers 144. The pneumatic cylinder 156 is extended to move the sled 154 and sleeve s contained therein into alignment with the conveyor arbor 132 as shown in FIG. 20 with the right hand pair 144a of the fingers 144 engaging the sleeve s. The front wall 160 is moved slightly away from the remainder of the sled 154 such that the sleeve handling fingers 144 can axially move the sleeve s from the sled 154 onto the first conveyor arbor 132.

As previously described, the sleeve handling fingers 144 are mounted for generally horizontal movement parallel to the axes $a_1$, $a_2$ of the first and second conveyor arbors 132, 134. This horizontal movement is performed by pneumatic cylinders 157, 159 mounted on the sleeve conveyor trolley 124 as shown in FIGS. 1 and 7. The two pneumatic cylinders 157, 159 are a convenient way to perform a two step movement for loading two sleeves in seriatim from the sled 154 onto the first conveyor arbor 132. However, other stepped motion arrangements can be utilized particularly where more than two sleeves or cylinder liners are accommodated for grinding at the same time. In any event, as shown in FIG. 7, a sleeve $s_1$ located in the sled 154 is engaged by arcuate shoulders of a pair of the sleeve handling fingers 144 and moved from the sled 154 onto the arbor 132.

The fingers 144 are moved sufficiently far to move the sleeve $s_1$ onto the conveyor arbor 132 and to position the left hand pair 144b of the fingers 144 into position adjacent to the sled 154 for engaging a sleeve $s_2$ which has been passed from the sleeve feeder 128 to the sled 154 and extended on the sled 154 as described before, see FIG. 8. The fingers 144 are operated to move the sleeve $s_2$ from the sled 154 onto the conveyor arbor 132 as was the previous sleeve $s_1$ which is simultaneously moved further onto the conveyor arbor 132 by the fingers 144, see FIG. 9. The fingers 144 are pivoted to retract the fingers 144 such that the conveyor arbor support member 136 and the arbors 132, 134 thereon can be raised to the fully raised, travel position as shown in FIG. 10. Sleeves, such as the sleeves $s_1$ and $s_2$, are held in position on the conveyor arbor 132 by clamps 168 which are operated by pneumatic cylinders 170, see FIGS. 1, 2 and 4. Sleeves on the conveyor arbor 134 are also held in position by clamps 168 during travel operations.

The conveyor arbor support member 136 and the conveyor arbors 132, 134 thereon and the associated sleeve handling fingers 144 are then moved from the first sleeve handling station 126, as shown in dotted line in FIG. 1B, to the second sleeve handling station 129, as shown in solid line in FIG. 1A. The conveyor arbor support member 136 and the arbors 132, 134 thereon are lowered to the intermediate position or finished sleeve handling position such that the empty second conveyor arbor 134 is substantially aligned with the grinding arbor 108 as shown in 11.

The conveyor arbor support member 136 and the arbors 132, 134 are moved toward the grinding arbor 108 such that the empty second conveyor arbor 134 and the grinding arbor 108 are substantially abutting one another to facilitate transfer of sleeves between the two arbors. The fingers 144 are then moved to the left to position them such that they engage finished sleeves $s_3$ and $s_4$ which have been ground as previously described and are positioned on the grinding arbor 108 when they are pivotally extended to their sleeve engaging position, see FIG. 12. The fingers 144 are then moved to the right to move the finished sleeves $s_3$ and $s_4$ from the grinding arbor 108 to the second conveyor arbor 134 and the fingers 144 are pivotally retracted, see FIG. 13.

The conveyor arbor support member 136 and the arbors 132, 134 thereon are then moved slightly away from the grinding arbor 108 and lowered to the fully lowered position or unfinished sleeve handling position such that the first conveyor arbor 132 with the sleeves $s_1$ and $s_2$ thereon is substantially aligned with the grinding arbor 108 as shown in 14. The conveyor arbor support member 136 and the arbors 132, 134 are moved toward the grinding arbor 108 such that the first conveyor arbor 132 and the grinding arbor 108 are substantially abutting one another to facilitate transfer of sleeves between the two arbors.

The fingers 144 are pivotally extended to engage the sleeves $s_1$ and $s_2$ on the first conveyor arbor 132 and horizontally moved to carry the sleeves $s_1$ and $s_2$ from the first conveyor arbor 132 to the grinding arbor 108 as shown in FIG. 15. The fingers 144 are pivotally retracted and the conveyor arbor support member 136 and the arbors 132, 134 thereon are then moved slightly away from the grinding arbor 108 and raised to the fully raised, travel position as shown in FIG. 16.

The conveyor arbor support member 136 and the conveyor arbors 132, 134 thereon and the associated sleeve handling fingers 144 are then moved from the second sleeve handling station 129, shown in solid line in FIG. 1A, back to the first sleeve handling station 126, shown in dotted line in FIG. 1B, over the top of the main grinding portion of the system 100. The conveyor arbor support member 136 and the arbors 132, 134 thereon are then lowered to the intermediate position or finished sleeve handling position such that the second conveyor arbor 134 loaded with the finished sleeves $s_3$ and $s_4$ is substantially aligned with the pivoting arbor 142 which has been pivoted to its generally horizontal position as shown in FIGS. 17 and 18.

The fingers 144 are pivotally extended to engage the finished sleeves $s_3$ and $s_4$ on the second conveyor arbor 134 and horizontally moved to carry the finished sleeves $s_3$ and $s_4$ from the second conveyor arbor 134 to the pivoting arbor 142 as shown in FIG. 18. The fingers 144 are pivotally retracted and the conveyor arbor support member 136 and the arbors 132, 134 thereon are then lowered to the fully lowered position such that the first conveyor arbor 132 is positioned adjacent to the sleeve loader sled 154 and axially aligned with the work axis $a_w$. The operation with respect to loading unfinished sleeves and unloading finished sleeves as illustrated in FIGS. 7–12 is then repeated and continues as described above relative to FIG. 7.

The finished sleeves, for example, the finished sleeves $s_3$ and $s_4$ described above, must next be carried to a gauging station 172 and ultimately to an exit conveyor 174, see FIGS. 1 and 22–30. Based on the measurements made at the gauging station 172, acceptably ground finished sleeves are passed to an acceptable sleeve area 176 with sleeves which were not acceptably ground being diverted to a rejection conveyor 178 by a pneumatic cylinder operated gate 180. The pivoting arbor 142 couples the main grinding portion of the grinding system 100 to the gauging and exit conveyor portion of the grinding system 100.

As shown in FIGS. 1, 7, 17 and 18, the pivoting arbor 142 is pivotally moved between a generally horizontal position shown in FIGS. 17 and 18 and a generally vertical position shown in FIG. 7 by a hydraulic cylinder 182. The pivoting arbor 142 pivots about a pivot point 184 through which an axis $a_p$ shown in FIG. 3 passes. The pivoting arbor 142 is not shown in FIG. 3 since it would substantially block details shown therein.

After finished sleeves, such as the finished sleeves $s_3$ and $s_4$, are transferred from the second conveyor arbor 134 to the pivoting arbor 142, the pivoting arbor 142 is pivoted to its generally vertical position by the hydraulic cylinder 182 as shown in FIG. 7. In its vertical position, the pivoting arbor 142 is located beneath a sleeve stop plate 186 which is positioned over a first gripper 188 as shown in FIGS. 1 and 7. The pivoting arbor 142 can also be vertically moved when in its vertical position by means of a pneumatic cylinder 190. As the pivoting arbor 142 is raised by the cylinder 190, it extends through a circular opening 200 in the sleeve stop plate 186 which is sized to receive the pivoting arbor 142 but not sleeves s on the arbor 142.

Figure 28:
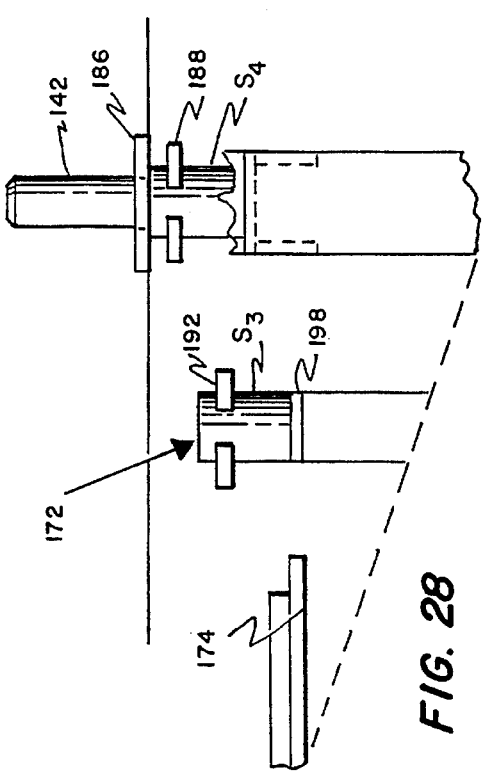

As shown in FIGS. 23 and 28, the arbor 142 is moved to a point that the uppermost sleeve on the pivoting arbor 142 contacts the sleeve stop plate 186 and stops the upward movement of the pivoting arbor 142. The pivoting arbor 142 and the uppermost sleeve pass through the opened jaws of the first gripper 188 which are then closed to engage the uppermost sleeve. The pivoting arbor is then lowered to permit the sleeve held by the first gripper 188 to be moved horizontally to the gauging station 172. A second gripper 192 is provided for moving sleeves from the gauging station 172 to the exit conveyor 174. The first and second grippers 188, 192 are vertically moved independently of one another by means of pneumatic cylinders 194, only one of which is shown in FIG. 7. The first and second grippers 188, 192 are moved horizontally in synchronism with one another by means of a pneumatic cylinder 196 shown in FIG. 1. A more detailed description of the operation of the first and second grippers 188, 192 will now be made with reference to FIGS. 22–30.

As shown in FIG. 22, a sleeve which has been gauged is held above a sleeve receiving platform 198 upon which finished sleeves s are placed for measurement in the gauging station 172. The pivoting arbor 142 is being moved upwardly by the cylinder 190 toward the sleeve stop plate 186 to be extended through an opening 200 therein. In FIG. 23, the arbor 142 has been raised to a point where it extends above the sleeve stop plate 186 and the upper sleeve thereon, the sleeve $s_3$, engages the plate to stop the upward movement of the arbor 142. The gripper 188 is open such that both the arbor 142 and the uppermost sleeve on the arbor 142 can pass through the gripper 188. The gripper 188 is then closed to grip the uppermost sleeve, the sleeve $s_3$, and the arbor 142 is lowered as shown in FIG. 24 such that the sleeve $s_3$ can be moved by the gripper 188 to the gauging station 172.

At this time, the grippers 188, 192 are moved to the left as shown in the FIGS. 22–30 such that the sleeve s is moved over the exit conveyor 174 and the sleeve $s_3$ is moved over the sleeve receiving platform 198 of the gauging station 172. The grippers 188, 192 are then lowered by the cylinders 194, see FIG. 7, to place the sleeve s on the exit conveyor 174 and to place the sleeve $s_3$ onto the sleeve receiving platform 198 of the gauging station 172 as shown in FIG. 25. The grippers 188, 192 are then opened and raised to permit the sleeve s to be carried away by the exit conveyor 174 and the sleeve $s_3$ to be supported upon the sleeve receiving platform 198 as shown in FIG. 26.

The open grippers 188, 192 are then moved to the right as shown in FIGS. 22–30 such that the gripper 188 is moved beneath the sleeve stop plate 186 and the gripper 192 is over the sleeve $s_3$ on the sleeve receiving platform 198 of the gauging station 172 as shown in FIG. 27. The sleeve $s_3$ is then elevated by the sleeve receiving platform 198 through the open gripper 192 and into the gauging station 172. This operation is shown by the dotted line drawing in FIG. 27.

The gauging station 172 comprises a sleeve measurement system which is commercially available from the Etamic corporation and performs a series of measurements on sleeves which are inserted into the gauging system. In the case of cylinder liners for internal combustion engines, the sleeve measurement system measures all machining operations which have been performed on the liners including the grinding operation which is performed by the grinding system 100 of the present invention.

The measurement or gauging system generates signals representative of the measurements which it takes and passes these signals to a controller which is housed in the system control center 202 which also includes a variety of controls, input/output devices, displays and the like. The system control center utilizes the measurement signals to determine whether a cylinder liner or other type sleeve has been properly ground by the grinding system 100 as well as properly machined by previously performed machining operations. This evaluation is used to determine whether to allow liners to be transported to the acceptable sleeve area 176 by the exit conveyor 174 or to be diverted to a rejection conveyor 178 by a cylinder operated gate 180. In accordance with another aspect of the present invention, the measurement signals are also used to better dress the grinding wheel 104 to perform a better grinding operation.

Figure 29:
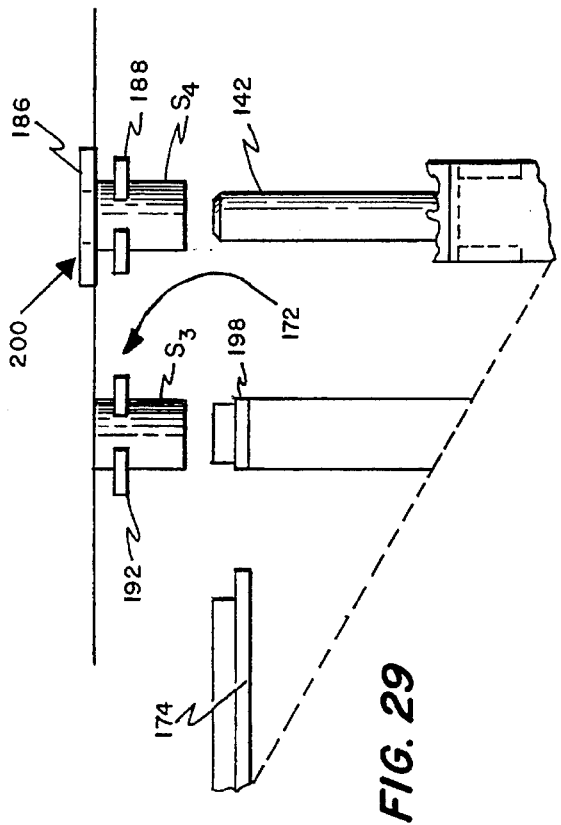

After the gauging operation has been performed, the sleeve which has been gauged, such as sleeve $s_3$, is lowered through the open second gripper 192 to the position shown in the solid line drawing of FIG. 27. The pivoting arbor 142 is again raised to a point that the uppermost sleeve on the pivoting arbor 142, now the sleeve $s_4$, contacts the sleeve stop plate 186 and stops the upward movement of the pivoting arbor 142. The pivoting arbor 142 and the uppermost sleeve, now the sleeve $s_4$, again pass through the opened jaws of the first gripper 188 which are then closed to engage the uppermost sleeve, the sleeve $s_4$. The open second gripper 192 is lowered to a position about the sleeve $s_3$ where it is closed to engage the sleeve $s_3$ and then the second gripper 192 is raised to its horizontal travel position as shown in FIG. 29.

Figure 30:
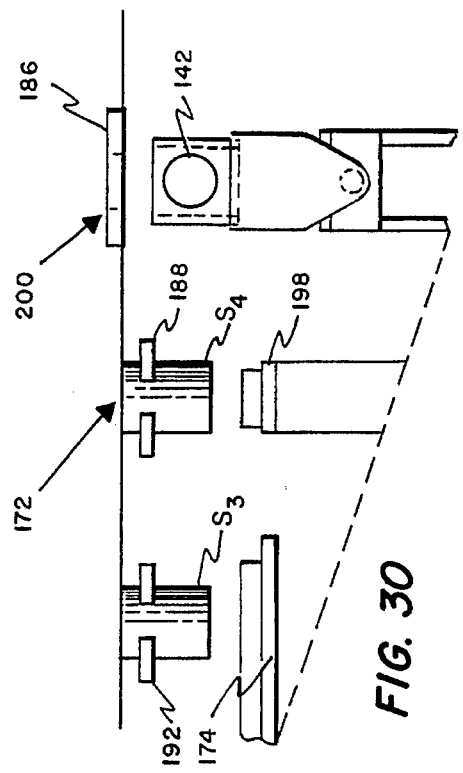

The pivoting arbor 142 is then lowered to permit the sleeve $s_4$ held by the first gripper 188 to be moved horizontally to the gauging station 172 and the sleeve which has just been gauged, as illustrated the sleeve $s_3$, is moved to the exit conveyor 174. The pivoting conveyor 142 is then pivoted to its horizontal position for receiving the next two finished sleeves which have been ground by the grinding system 100 as shown in FIGS. 17, 18 and 30.

As mentioned, the measurement signals generated by the gauging system are used to better dress the grinding wheel 104 to perform a better grinding operation. The grinding wheel 104 is periodically dressed by a conventional diamond dressing wheel 204 shown in FIGS. 1 and 2. For an internal combustion cylinder liner operation, it is currently preferred to dress the grinding wheel after each grinding operation, i.e. the wheel is dressed before each grinding operation; however, less frequent dressing is possible and may be preferred for other sleeve grinding operations.

In accordance with the present invention, the dressing operations are performed in response to measurement signals generated by the gauging system by compensating for variations in the measurements taken from finished sleeves to the specified dimensions which should have been taken. In this way, variations within the grinding system due, for example to minor deformations of the grinding arbor during grinding operations, can be better corrected and compensated. Trends of the measurement signals are used for the grinding wheel dressing operations such that ongoing changes within the grinding system can be corrected. For example, trends may be determined by aggregating measurement data over a series of sleeves, for example the measurements made on twelve or more sleeves may be accumulated to determine trends. Measurement of such trends also assists in performing maintenance and anticipating operating problems within the grinding system 100.

In the illustrated embodiment, a series of four measurements are taken at four separated axial locations along finished sleeves. These four measurements are used to determine how the grinding operation was performed. Of course, if the four measurements (or other measurements made of previous machining operations) indicate the sleeve is unacceptable, it is rejected. In addition, the four measurements are used to adjust the dressing of the grinding wheel 104. It is currently preferred to linearly compensate for grinding errors detected by the four measurements. Thus, if one or more of the four points of measurement is high, the wheel 104 will be dressed more deeply at that point or points. Conversely, if one or more of the four points of measurement is low, the wheel 104 will be dressed less deeply at that point or points.

Figure 32:
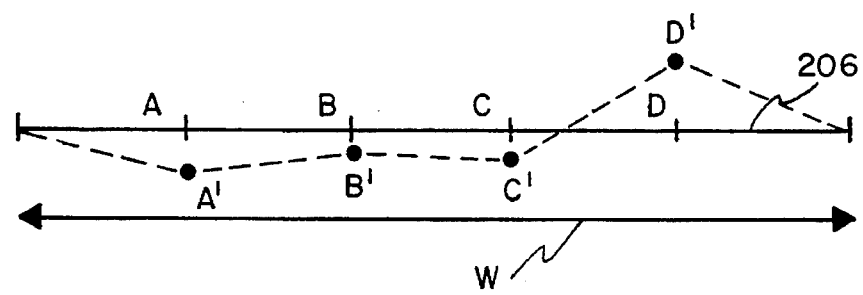
FIG. 32 illustrates linear dressing of a grinding wheel using post grinding measurements in accordance with the present invention.

Dressing is preferably linearly performed as noted. Linear dressing is illustrated in FIG. 32 wherein the dress width W of the wheel 104 is ideally indicated at 206 with the four measurement points being indicated as A, B, C and D. The wheel dressing corrections required at each of the four measurement points A, B, C and D are determined from gauging finished parts in the gauging station 172 which are indicated by the measurement signals. As shown in FIG. 32, four arbitrary corrections from the ideal wheel dressing 206 are indicated as A', B', C' and D' which are linearly connected to define the dressing profile for the wheel 104 based on the finished sleeves which have been ground by the grinding system 100. It is noted that the measurements taken in the gauging station 172 are also used to calibrate the in-process gauges 120, 122 to better ensure their accuracy during the grinding operation.

Having thus described the invention of the present application in detail and by reference to preferred embodiments thereof, it will be apparent that modifications and variations are possible without departing from the scope of the invention defined in the appended claims.

What is claimed is:

1. A grinding system for simultaneously grinding multiple sleeves in a single grinding operation, said grinding system comprising:

a fixed machine bed;

a grinding wheel mounted upon said fixed machine bed for controlled rotation about a fixed axis defined by bearings at each end of said wheel, said grinding wheel being sufficiently wide to simultaneously grind all of said multiple sleeves with said multiple sleeves being axially aligned;

a friction bearing slide mounted upon said machine bed for movement toward and away from said grinding wheel in a direction generally perpendicular to said fixed axis;

a headstock mounted to said slide;

a grinding arbor having a proximal end mounted to said headstock to cantilever support said grinding arbor and a distal end, said grinding arbor supporting multiple sleeves thereon with axes of said multiple sleeves being collinear along said grinding arbor and parallel to the fixed axis of said grinding wheel;

a retractable steady rest for engaging the distal end of said grinding arbor during grinding operations; and a servo drive connected between said machine bed and said friction bearing slide for moving said slide upon said machine bed toward and away from said grinding wheel.

2. A grinding system as claimed in claim 1 further comprising a swivel plate for mounting said friction bearing slide to said machine bed.

3. A grinding system as claimed in claim 1 further comprising a sleeve handler system for removing finished sleeves from said grinding arbor and loading unfinished sleeves onto said grinding arbor, said sleeve handler system comprising:

a sleeve conveyor trolley having a first conveyor arbor for carrying unfinished sleeves and a second conveyor arbor for carrying finished sleeves;

sleeve handling fingers associated with said sleeve conveyor trolley for moving sleeves onto and off of said first and second conveyor arbors, said sleeve handling fingers being supported on said sleeve conveyor trolley for movement toward and away from said first and second conveyor arbors and for movement parallel to axes of said first and second conveyor arbors which are mounted for vertical movement on said sleeve conveyor trolley;

a sleeve loader station for loading unfinished sleeves to be ground by said grinding system onto said first conveyor arbor;

a sleeve removal station for removing finished sleeves after being ground by said grinding system from said second conveyor arbor, said sleeve removal station and said sleeve loader station defining a first sleeve handling station; and said sleeve conveyor trolley moving said first and second conveyor arbors between said first sleeve handling station and a second sleeve handling station adjacent said distal end of said grinding arbor.

4. A grinding system as claimed in claim 3 wherein said first and second conveyor arbors are vertically movable between a travel position, an unfinished sleeve handling position and a finished sleeve handling position.

5. A grinding system as claimed in claim 3 wherein said sleeve unloading station includes a pivotally mounted finished sleeve receiving arbor, said finished sleeve receiving arbor being pivoted to a first position for receiving finished sleeves from said second conveyor arbor and to a second position for removal of finished sleeves from said finished sleeve receiving arbor.

6. A grinding system as claimed in claim 5 wherein said sleeve loader station comprises a sleeve loader sled movable between a sleeve receiving position and a sleeve delivery position, said sleeve handling fingers being operable with said sleeve loader sled to move multiple unfinished sleeves onto said first conveyor arbor.

7. A grinding system as claimed in claim 6 wherein said sleeve loader sled moves individual sleeves from said sleeve receiving position to said sleeve delivery position, said sleeve handling fingers being moveable in steps to move individual sleeves in seriatim onto said first conveyor arbor to thereby move multiple unfinished sleeves onto said first conveyor arbor.

8. A grinding system as claimed in claim 6 wherein the first position of said finished sleeve receiving arbor orients said finished sleeve receiving arbor substantially horizontal and said second position of said finished sleeve receiving arbor orients said finished sleeve receiving arbor substantially vertical.

9. A grinding system as claimed in claim 8 further comprising:
  a sleeve gauging system for measuring finished sleeves and generating signals representative of measurements of finished sleeves; and
  a first gripper for carrying finished sleeves from said sleeve unloading station to said sleeve gauging system.

10. A grinding system as claimed in claim 9 wherein said sleeve receiving arbor is vertically movable when in said second, substantially vertical position for moving finished sleeves on said finished sleeve receiving arbor through said first gripper for engagement by said first gripper.

11. A grinding system as claimed in claim 9 further comprising:
  an exit conveyor for carrying finished sleeves from said grinding system; and
  a second gripper for carrying finished sleeves from said sleeve gauging system to said exit conveyor.

12. A grinding system as claimed in claim 11 further comprising a grinding wheel dressing system responsive to signals generated by said gauging system for dressing said grinding wheel to compensate for errors in finished sleeves resulting from characteristics of said gauging system.

13. A grinding system as claimed in claim 12 wherein said gauging system generates signals representative of error trends in finished sleeves and generates trend signals for controlling said grinding wheel dressing system.

14. A grinding system as claimed in claim 13 wherein said first sleeve handling station is positioned on a first side of said grinding system and said second sleeve handling station is positioned on a second side of said grinding system opposite to said first side, said sleeve conveyor trolley moving between said first and second sides of said grinding system over the top of said grinding system to move between said first sleeve handling station and said second sleeve handling station.

15. A method for simultaneously grinding multiple sleeves in a single grinding operation comprising the steps of:
  rotating a grinding wheel fixedly mounted upon a machine bed for controlled rotation about a fixed axis defined by bearings at each end of said wheel, said wheel being sufficiently wide to simultaneously grind all of said multiple sleeves with said multiple sleeves being axially aligned;
  mounting a friction bearing slide on said machine bed for movement of said slide toward and away from said grinding wheel in a direction generally perpendicular to said fixed axis;
  rotating a headstock mounted to said slide;
  supporting multiple sleeves axially collinear on a grinding arbor having a distal end and a proximal end mounted to said headstock to cantilever support said grinding arbor parallel to the fixed axis of said grinding wheel;
  engaging a retractable steady rest with the distal end of said grinding arbor during grinding operations;
  moving said slide upon said machine bed toward said grinding wheel for grinding multiple sleeves on said grinding arbor;
  retracting said steady rest; and
  moving said slide upon said machine bed away from said grinding wheel for loading and unloading said grinding arbor.

16. A grinding method as claimed in claim 15 further comprising the steps of:
  carrying unfinished sleeves from a sleeve loader station to a sleeve handling station adjacent said grinding arbor on a first conveyor arbor supported upon a sleeve conveyor trolley;
  unloading finished sleeves from said grinding arbor onto a second conveyor arbor supported upon said sleeve conveyor trolley;
  loading unfinished sleeves from said first conveyor arbor onto said grinding arbor; and
  carrying finished sleeves on said second conveyor arbor onto a sleeve removal station.

17. A grinding method as claimed in claim 16 further comprising the steps of:
  unloading finished sleeves from said second conveyor arbor onto a finished sleeve receiving arbor in a sleeve removal station; and
  loading unfinished sleeves from a sleeve loader sled in said sleeve loader station onto said first conveyor arbor.

18. A grinding method as claimed in claim 17 further comprising the steps of:
  moving finished sleeves from said sleeve removal station to a sleeve gauging system;
  gauging finished sleeves; and
  generating signals representative of measurements taken by said gauging system.

19. A grinding method as claimed in claim 18 further comprising the step of accepting finished sleeves based on measurement signals generated by said gauging system.

20. A grinding method as claimed in claim 19 further comprising the step of dressing said grinding wheel based on measurement signals generated by said gauging system.

21. A grinding method as claimed in claim 20 further comprising the step of clamping said sleeves to said first and second conveyor arbors as said sleeves are being carried on said first and second conveyor arbors.

* * * * *